United States Patent
Janett

(10) Patent No.: US 11,944,931 B2
(45) Date of Patent: Apr. 2, 2024

(54) DIRECT AIR CAPTURE DEVICE

(71) Applicant: CLIMEWORKS AG, Zurich (CH)

(72) Inventor: Andri Janett, Zurich (CH)

(73) Assignee: CLIMEWORKS AG, Zurich (CH)

(*) Notice: Subject to any disclaimer, the term of this patent is extended or adjusted under 35 U.S.C. 154(b) by 0 days.

(21) Appl. No.: 18/321,360

(22) Filed: May 22, 2023

(65) Prior Publication Data

US 2023/0415089 A1    Dec. 28, 2023

(30) Foreign Application Priority Data

Jun. 24, 2022 (EP) .................... 22181019

(51) Int. Cl.
*B01D 53/02* (2006.01)
*B01D 53/04* (2006.01)

(52) U.S. Cl.
CPC ..... *B01D 53/0415* (2013.01); *B01D 53/0438* (2013.01); *B01D 53/0446* (2013.01); *B01D 2257/504* (2013.01); *B01D 2257/80* (2013.01); *B01D 2259/4009* (2013.01); *B01D 2259/4068* (2013.01)

(58) Field of Classification Search
CPC ............ B01D 53/0415; B01D 53/0438; B01D 53/0446; B01D 2257/504; B01D 2257/80; B01D 2259/4009; B01D 2259/4068
See application file for complete search history.

(56) References Cited

U.S. PATENT DOCUMENTS

| | | |
|---|---|---|
| 3,857,545 A | 12/1974 | Santi |
| 6,878,186 B2 | 4/2005 | Neary |
| 8,034,164 B2 | 10/2011 | Lomax, Jr. et al. |
| 11,266,943 B1 | 3/2022 | Stark, Jr. |
| 2005/0005609 A1 | 1/2005 | Coleman et al. |
| 2011/0296872 A1 | 12/2011 | Eisenberger |

(Continued)

FOREIGN PATENT DOCUMENTS

| | | |
|---|---|---|
| EP | 0 864 819 A2 | 9/1998 |
| EP | 3 725 391 A1 | 10/2020 |

(Continued)

OTHER PUBLICATIONS

European Search Report for 22 18 1019.5, dated Nov. 11, 2022.

*Primary Examiner* — Christopher P Jones
(74) *Attorney, Agent, or Firm* — Sughrue Mion, PLLC

(57) ABSTRACT

Separation station (1) with a plurality of separation units (34) for separating carbon dioxide and/or water vapour from ambient air, wherein each separation unit (34) comprises at least one contiguous and sealing circumferential wall circumferentially enclosing at least one cavity (24), said at least one contiguous and sealing circumferential wall defining an upstream opening (35) and an opposed downstream opening (36), said cavity (24) containing at least one gas adsorption structure (25) for adsorbing said at least one gaseous component, preferably under ambient pressure and/or temperature conditions, wherein said plurality of separation units (34) is arranged in at least one essentially vertical collector wall structure (2), laterally enclosing one single common separation station cavity (21), and wherein to the upper side, said separation station cavity (21) is covered and closed by at least one cover unit (1) with at least one air propelling device (10).

9 Claims, 10 Drawing Sheets

(56) References Cited

U.S. PATENT DOCUMENTS

| | | | |
|---|---|---|---|
| 2012/0174779 | A1 | 7/2012 | Eisenberger |
| 2017/0326494 | A1 | 11/2017 | Gebald et al. |
| 2020/0206673 | A1* | 7/2020 | Sundaram .............. B01D 53/08 |
| 2020/0230548 | A1* | 7/2020 | Libert .................... B01D 53/62 |
| 2023/0211278 | A1* | 7/2023 | Eisenberger ....... B01D 53/0431 |
| | | | 95/139 |

FOREIGN PATENT DOCUMENTS

| | | |
|---|---|---|
| FR | 1.148.736 A | 12/1957 |
| GB | 621195 A | 4/1949 |
| JP | 2009-172479 A | 8/2009 |
| WO | 2013/117827 A1 | 8/2013 |
| WO | 2013/166432 A1 | 11/2013 |
| WO | 2015/185434 A1 | 12/2015 |
| WO | 2016/005226 A1 | 1/2016 |
| WO | 2017/009241 A1 | 1/2017 |
| WO | 2018/083109 A1 | 5/2018 |
| WO | 2019/092128 A1 | 5/2019 |
| WO | 2020/212146 A1 | 10/2020 |
| WO | 2021/189042 A1 | 9/2021 |
| WO | 2021/252695 A1 | 12/2021 |

* cited by examiner

Fig.1a)
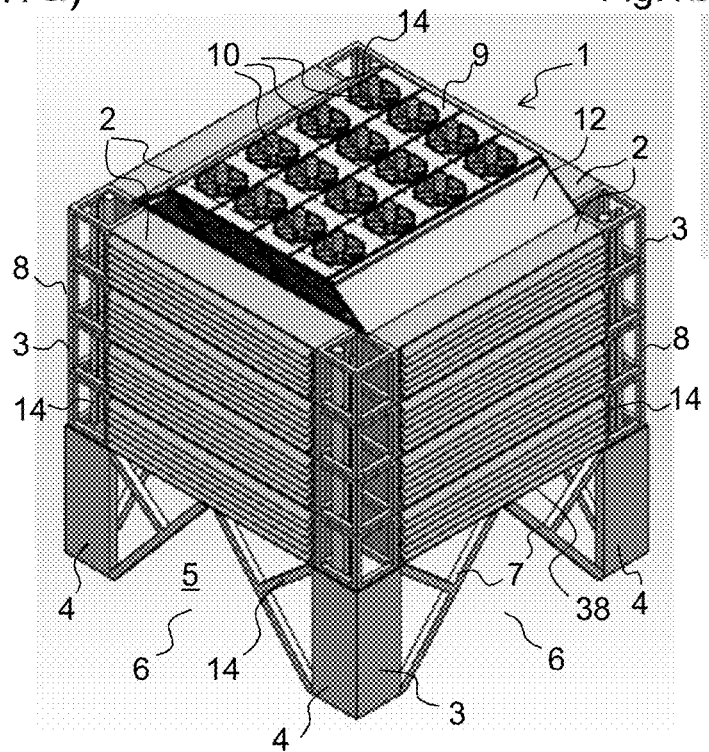
Fig.1b)
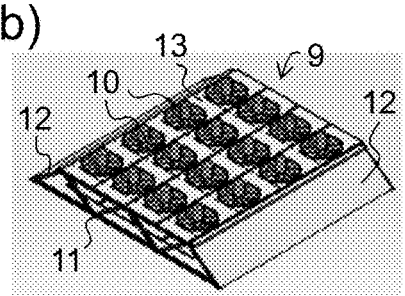
Fig.1c)
Fig.1d)
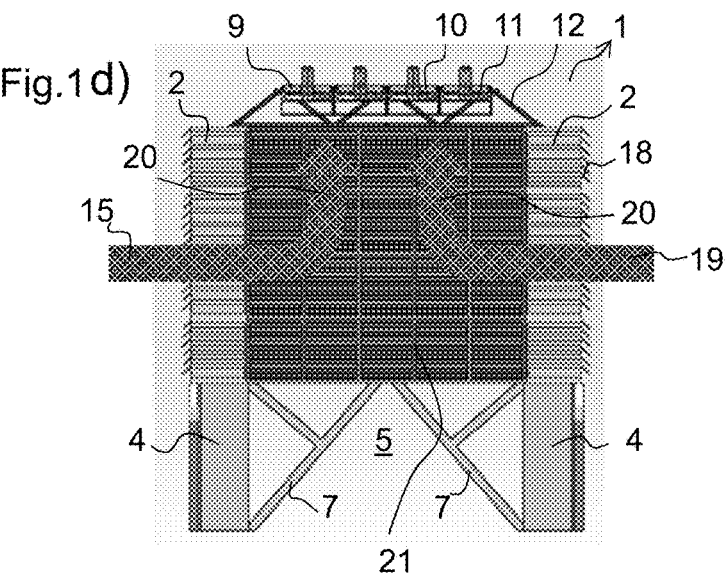

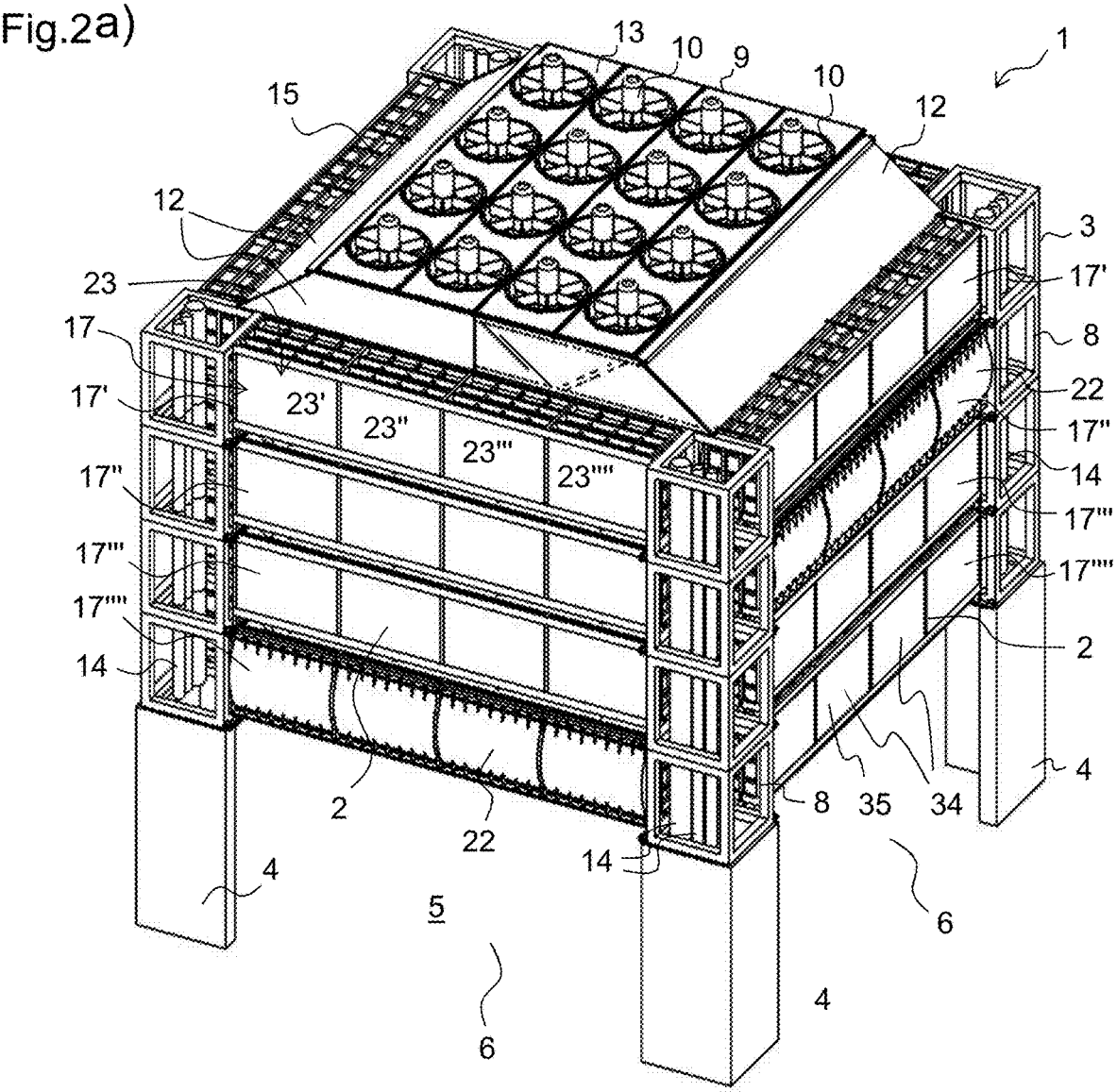

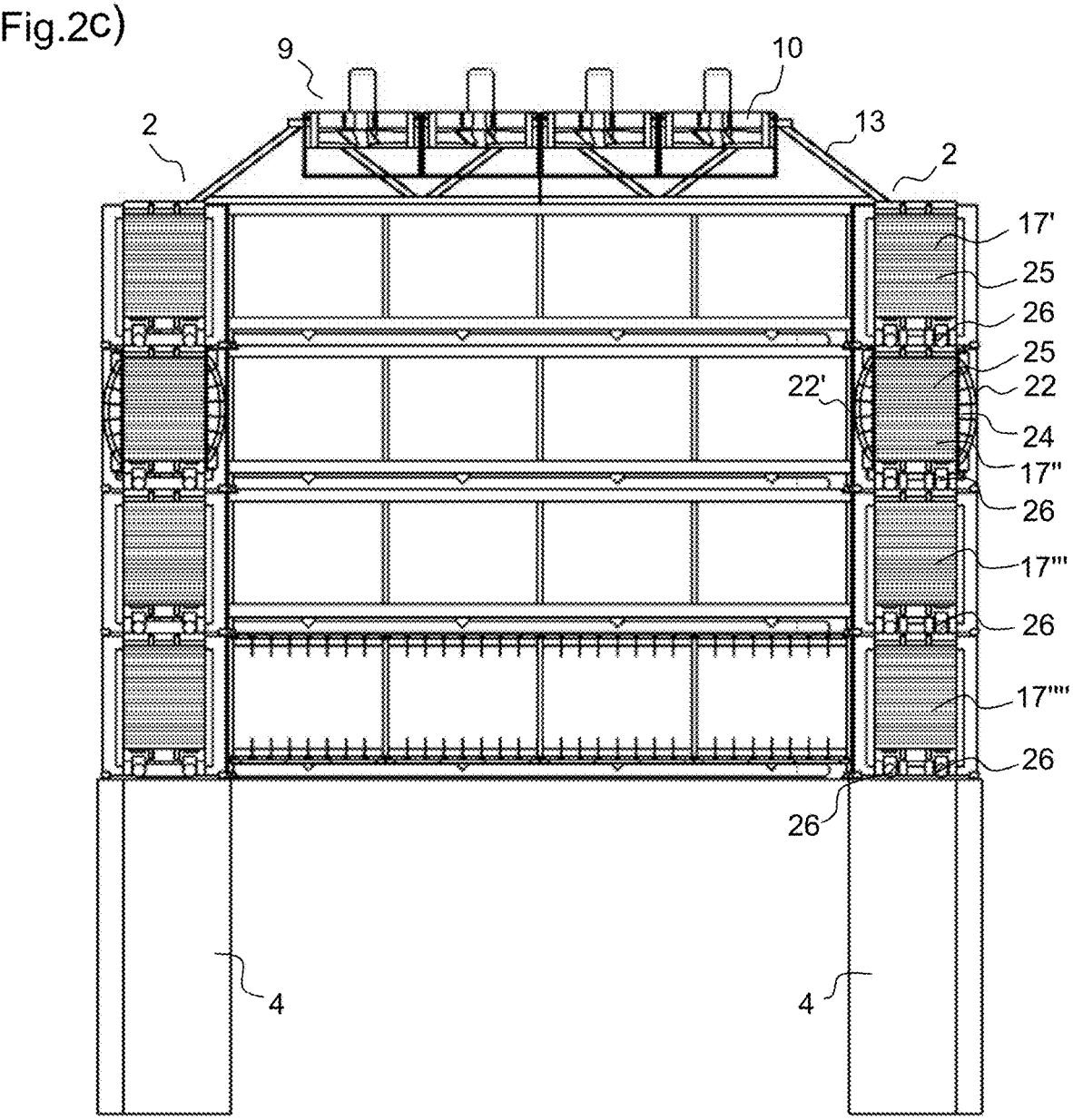

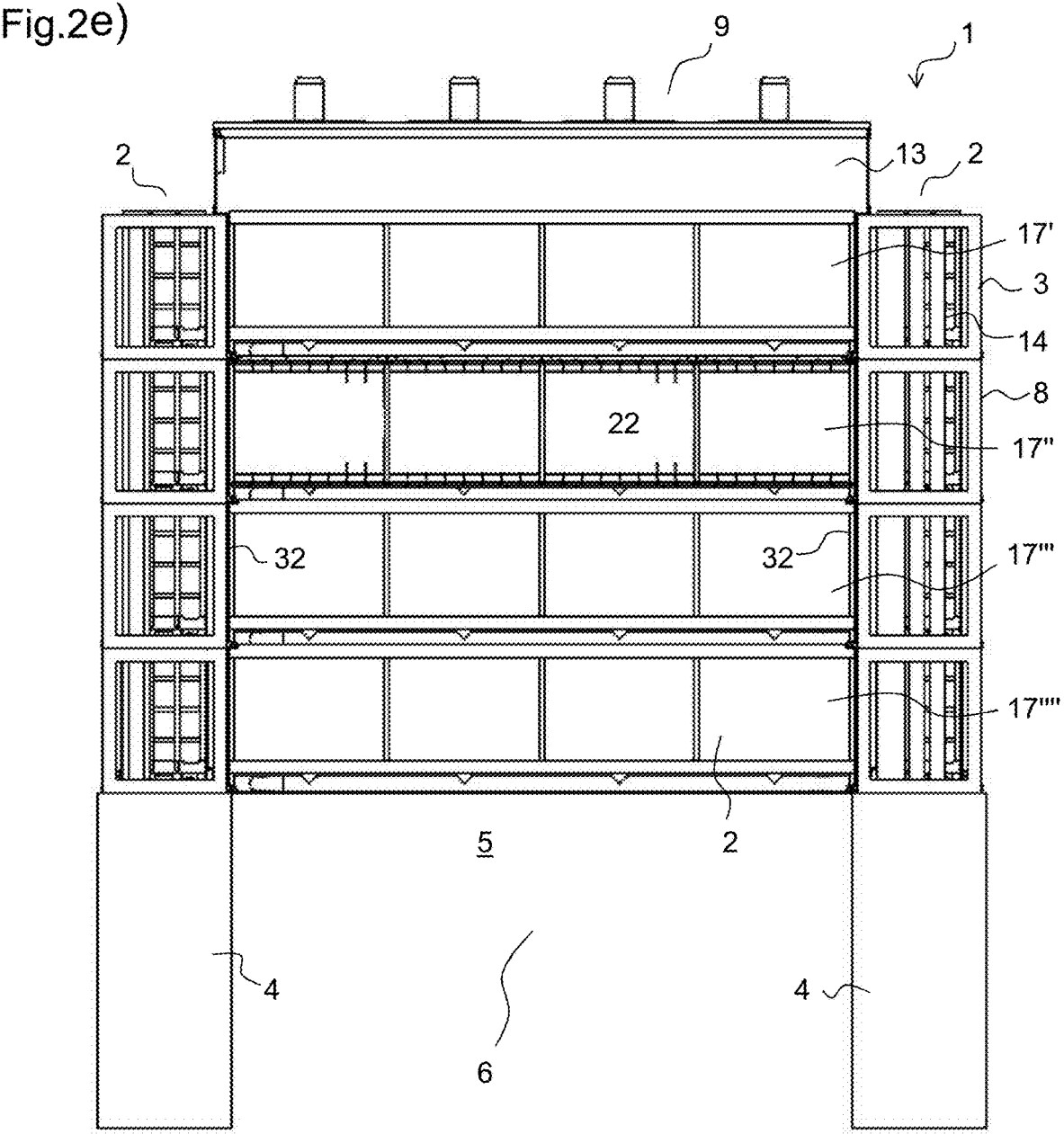

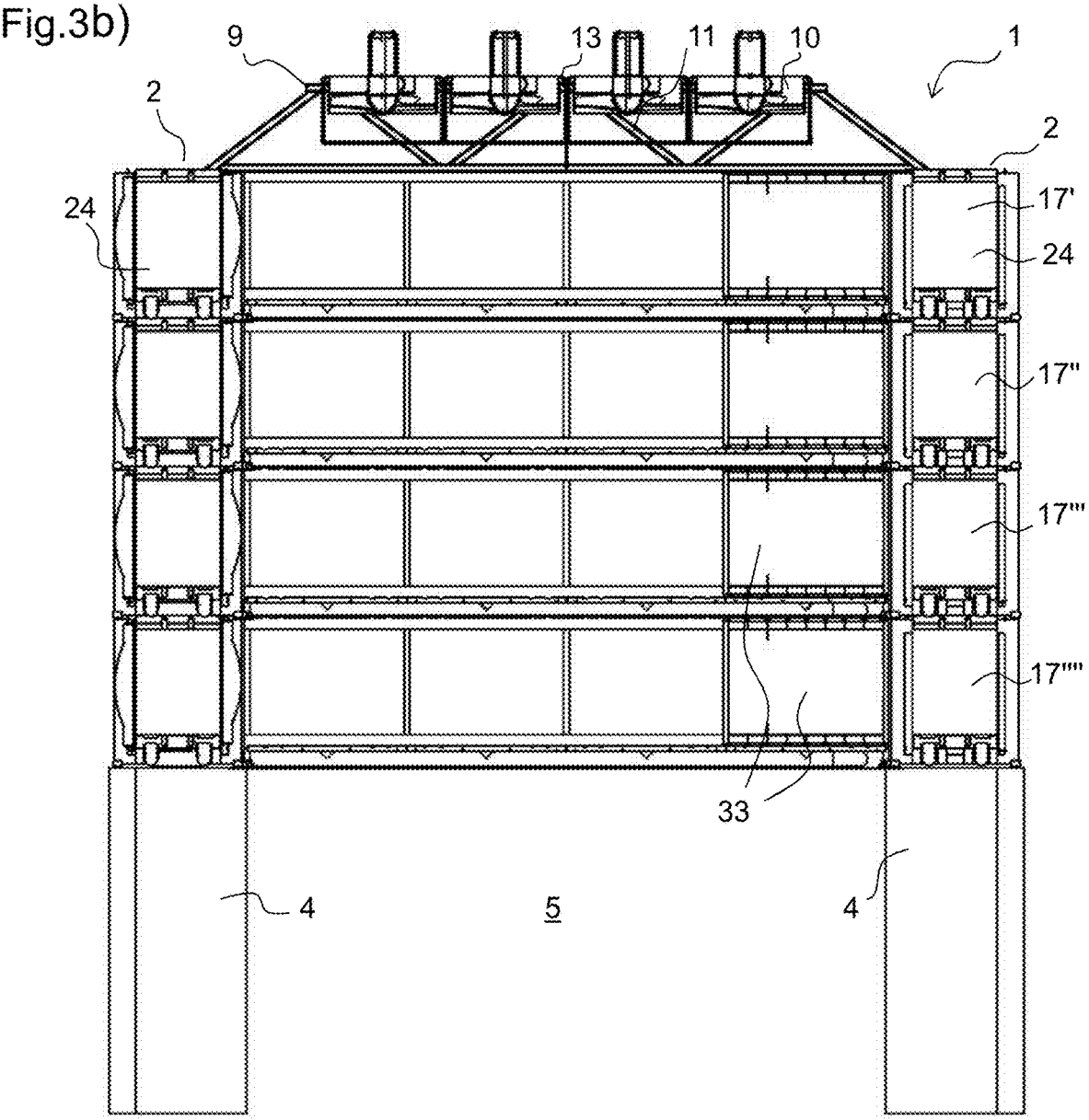

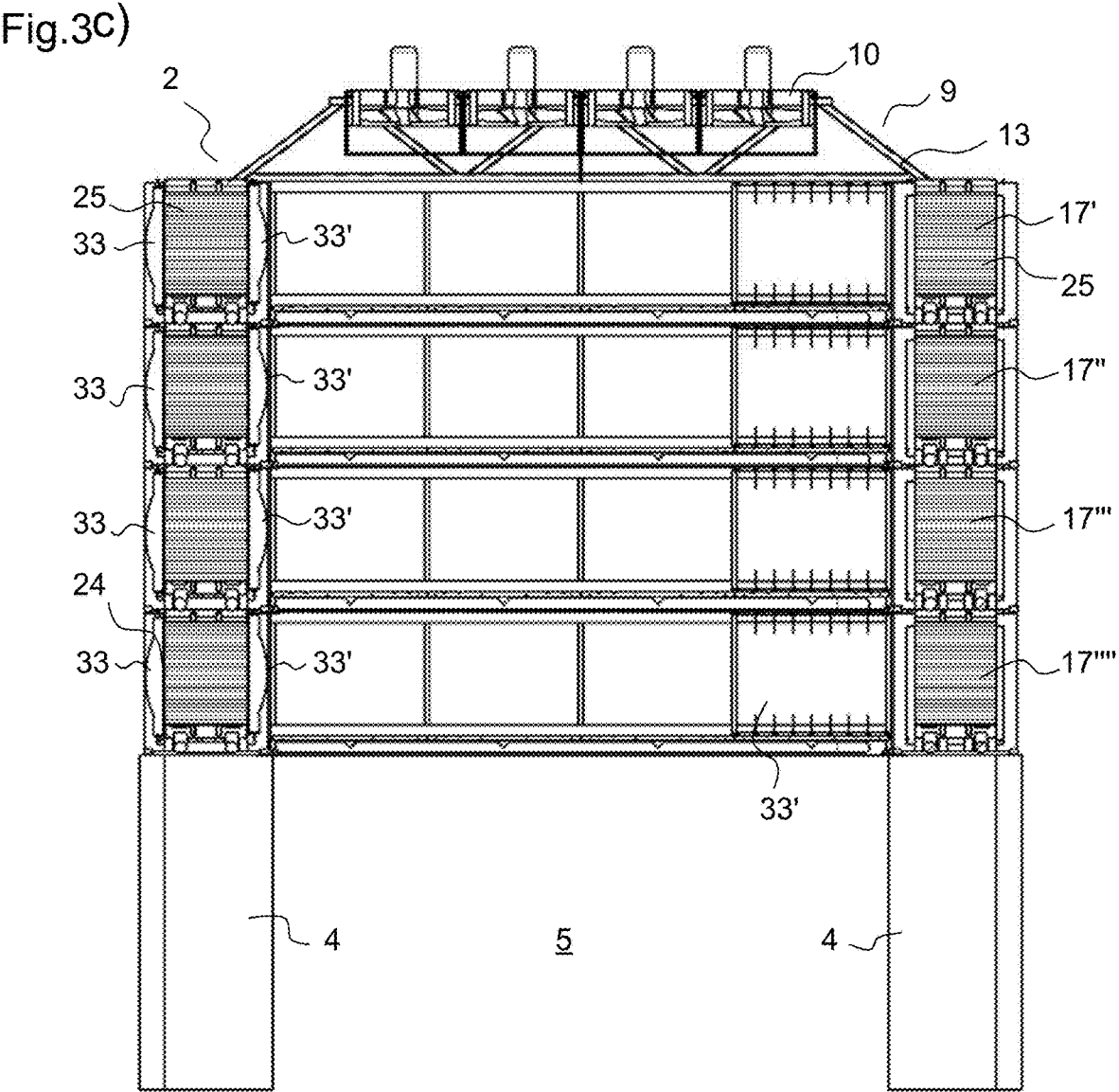

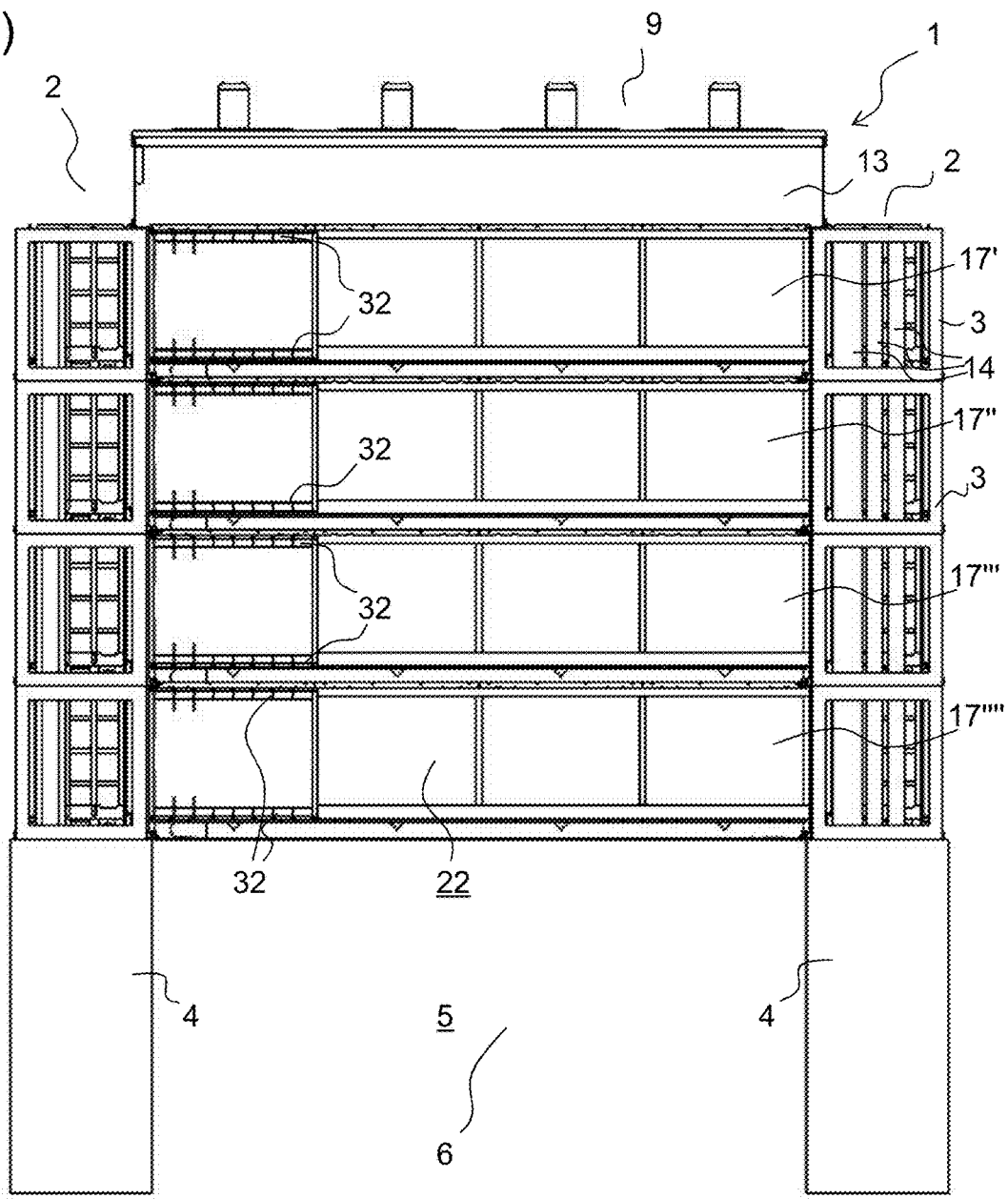

DIRECT AIR CAPTURE DEVICE

TECHNICAL FIELD

The present invention relates to a new device for gas separation in particular for direct air capture, such as CO2 capture from air, providing in particular large flow through cross sections, low pressure drops, low thermal mass, little/few structural parts and high efficiency. Also provided is a method for the operation of such devices as well as parts of such devices.

PRIOR ART

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process. One important application is capturing carbon dioxide (CO2) from gas streams, e.g., from flue gases, exhaust gases, industrial waste gases, or atmospheric air. Capturing CO2 directly from the atmosphere, referred to as direct air capture (DAC), is one of several means of mitigating anthropogenic greenhouse gas emissions and has attractive economic perspectives as a non-fossil, location-independent CO2 source for the commodity market and for the production of synthetic fuels.

One particular approach for DAC is based on a cyclic adsorption/desorption process on solid, chemically functionalized sorbent materials. For example, in WO-A-2016005226 and WO-A-2017009241 processes based on cyclic adsorption/desorption assisted with steam and a suitable amine functionalized sorbent material respectively are disclosed for the extraction of carbon dioxide from ambient atmospheric air. Further WO 2019/092128 describes another class of sorbent materials based on potassium carbonate functionalization also suitable for cyclic CO2 adsorption/desorption processes.

The adsorption process normally takes place at ambient atmospheric conditions at which air is streamed through the sorbent material and a portion of the CO2 contained in the air is chemically and/or physically bound/adsorbed at the surface of or within the adsorbents. During subsequent CO2 desorption, the adsorbent material is normally heated and, optionally, the partial pressure of carbon dioxide surrounding the sorbent can be reduced (PSA—Pressure Swing Adsorption) by applying a vacuum or exposing the sorbent to a purge gas flow, such as but not limited to steam (PSA—Pressure Swing Adsorption). Thereby, the previously captured carbon dioxide is removed from the sorbent material and obtained in a concentrated form.

One of the main challenges for the energy and cost efficient realization of DAC arises from the low concentration of CO2 in atmospheric air (nominally around 400 ppm as of 2019) and the delivery of the correspondingly necessary large volumes of atmospheric air to a suitable gas separation structure. Suitable gas separation structures containing enclosed sorbent material have been presented in US2017/0326494 and WO-A-2018083109 and can be applied to batch wise adsorption-desorption processes in which said structure containing sorbent material needs to be alternately exposed to a high-volume flow air stream (adsorption/contacting) and then to desorption conditions characterized by elevated temperatures and/or vacuum pressures down to e.g. 10 mbar(abs). This requires chamber structures which on the one hand allow the sorbent material to be exposed to a high-volume flow of atmospheric air to adsorb CO2 and which can on the other hand appropriately seal the sorbent material from the ambient air during desorption and withstand sorbent material temperatures up to 130° C., mixtures of CO2, air, and water as vapor and liquid, as well as optionally, vacuum pressures down to 10 mbar(abs) or lower (if vacuum is required for the desorption). One such suitable structure is the unit disclosed in WO-A-2015185434. In general, particularly advantageous therefore is infrastructure which firstly minimizes pressure drop during adsorption flow through and secondly attributes the greatest portion of said pressure drop to the portion of the unit actually capturing CO2.

In the prior art there are many examples of cyclic adsorption/desorption processes which are typically conducted in long, narrow, thick wall columns with small flow cross sections. Said devices are used for pressure and/or vacuum swing based gas separation and are typically operated with very short cycle times in the order of seconds to a few minutes, during which their thermal mass or thermal inertia does not play a major role. Further, the devices are typically subjected to high pressure flows with high adsorbate concentrations and can thus use openings and flow conduits significantly smaller than their cross section as pressure drops over said features are relatively small. For example, U.S. Pat. No. 8,034,164 relates to multiple pressure swing adsorption columns operating in parallel and discloses details to column construction and assembly, details to control of flows and cycle optimization. U.S. Pat. No. 6,878,186 refers to a method and apparatus for pure vacuum swing desorption in a classical adsorption column, and to processes and apparatuses of classical adsorption columns. Certain prior art systems such as WO-A-2013117827 describe an gas separation structure based on parallel passages which indeed seek to reduce the pressure drop while being contained in a cylindrical pressure vessel for PSA processes.

If vacuum is used for the desorption step, there is the problem of pressure drop over gas control structures at the inlet and outlet. A number of prior art systems disclose large actuated swinging lids which are further designated as flaps or dampers, with said units not typically designed for pressure differences higher than about 0.2 bar. Certain isolation valves are specifically suited to vacuum applications but must have a significant material thickness and are limited in sizes to handle the large forces of vacuum application. In consequence, such valves have a high thermal mass when applied to alternating heating/cooling steps and cannot offer the necessary through flow area. Further certain prior art systems may have actuating mechanisms. EP-0 864 819 discloses a rotating flap valve for a fume hood built into ducting for use in ventilation applications but unsuitable for vacuum. US2005/005609 relates to a bypass/redirection damper (valve) for gas turbine applications but unsuitable for vacuum. GB-A-621195 discloses a curved vacuum lid, which seeks to reduce the material thickness, but is incompatible with the requirement of minimum pressure drop over the flow cross section due to the effective thickness of the lid in the ducting. FR-A-1148736 and U.S. Pat. No. 3,857,545 propose actuated vacuum lids and valves through which a vessel may be evacuated but are unsuitable to the many thousands of times larger airflows required in a DAC application.

A specific DAC vessel solution with a swinging lid is again found in WO-A-2015185434 however herein flow restrictions may decrease output. Some prior art systems for contacting and regeneration of solid sorbent material in DAC applications involve transferring the sorbent material and gas separation structure between a first region of air flow for adsorption and a second region in the form of a chamber for regeneration as illustrated in US 2012/0174779, US 2011/0296872 and WO-A-2013166432.

JP-A-2009172479 provides a carbon dioxide remover, which can efficiently adsorb carbon dioxide from the atmosphere and also, can eliminate the carbon dioxide only by slight heating. The proposed carbon dioxide remover is equipped with a carbon dioxide adsorption film of a perovskite structure with an exposure surface to the atmosphere containing carbon dioxide molecules, a heater for heating the carbon dioxide adsorption film, and an exhauster for exhausting the space around the carbon dioxide adsorption film. The carbon dioxide adsorption film performs a chemical adsorption of the carbon dioxide molecule from the atmosphere, and the heater causes the carbon dioxide molecule adsorbed by the carbon dioxide adsorption film to be released.

WO/2020/212146 discloses a separation unit for separating at least one gaseous component from a gas mixture, or arrangement of such separation units, wherein it comprises at least one circumferential wall element(s), said circumferential wall element(s) defining an upstream opening and an opposed downstream opening of at least one cavity containing at least one gas adsorption structure for adsorbing said gaseous component under ambient pressure and/or temperature conditions, or an array of at least two such cavities, wherein the separation unit comprises a pair of opposing sliding doors for sealing the openings of a cavity and preferably allowing for evacuating a cavity, and wherein the pair of opposing sliding doors can be shifted in a direction essentially parallel to the plane of the respective sliding door and to allow for flow through of gas mixture through the gas adsorption structure.

SUMMARY OF THE INVENTION

It is an object of the present invention to provide an improved carbon dioxide collector arrangement allowing for an as efficient as possible carbon dioxide capture process, in particular for direct air capture, preferably providing for modular architecture with optimum serviceability, replace ability, and construction and production costs and providing for an efficient operating process.

Accordingly, in a first aspect of the present invention, it relates to a separation station according to claim 1 for separating gaseous carbon dioxide from a gas mixture, preferably from at least one of ambient atmospheric air, flue gas and biogas, containing said gaseous carbon dioxide as well as further gases different from gaseous carbon dioxide, by cyclic adsorption/desorption using a sorbent material of said gas adsorption structure adsorbing said gaseous carbon dioxide in separation units.

More specifically, according to this first aspect of the present invention, it relates to a separation station with a plurality of stationary separation units for separating at least one gaseous component from a gas mixture containing that gaseous component, in particular for separating carbon dioxide and/or water vapour from ambient air.

According to the invention, each separation unit comprises at least one contiguous and sealing circumferential wall circumferentially enclosing at least one cavity, said at least one contiguous and sealing circumferential wall defining an upstream opening and an opposed downstream opening, said cavity containing at least one gas adsorption structure for adsorbing said at least one gaseous component, preferably under ambient pressure and/or temperature conditions. Typically the separation units have a rectangular or square cross-section perpendicular to flow-through direction, and preferably they all have the same cross-section and are arranged in two-dimensional arrays.

Further said plurality of separation units is arranged in at least one essentially vertical collector wall structure, laterally enclosing one single common separation station cavity. This single common separation station cavity is in fluid connection with all openings of all the separation units of the whole separation station, so it is a space common to all separation units without any separation wall within that common separation station cavity. Furthermore to the upper side, said separation station cavity is covered and closed by at least one cover unit with at least one air propelling device.

When reference is made to a plurality of stationary separation units in the context of the present invention this means that all separation units are fixed in space and in particular during the process of separating at least one gaseous component from a gas mixture containing that gaseous component the separation units and the gas adsorption structures contained therein remain in place and are not shifted between different positions in space for example to have one position in space for adsorption and another position in space for desorption.

This structure, in particular for direct air capture, provides for an optimum setup in which with one joint air propelling device or group of air propelling devices a whole plurality of separation units can be operated jointly and in a coordinated manner. As for the airflow it is optimum in that air exiting (for the case where the air propelling devices in the cover unit are pushing air into the common separation station cavity) or being sucked into (for the case where the air propelling devices in the cover unit or drawing air from the common separation station cavity) is travelling in a horizontal direction, and that air pushed away from or sucked into the cover unit travels in a vertical direction, which, in particular if a set of such separation stations is operated next to each other in a certain area, provides a huge advantage because it reduces efficiency reducing crosstalk between the separation stations.

More specifically, calculations show that decoupling the air propelling devices from individual separation units allows to reduce the number of air propelling devices per individual separation units, while at the same time providing for redundancy and reducing investment costs. Furthermore calculations show that there is generally a lower energy demand in the proposed design decoupling the air propelling devices from individual separation units since the overall volume flow can be reduced.

According to a first preferred embodiment of this invention it therefore also relates to a group of such separation stations located in an array next to each other.

Furthermore for the case where there is a plurality of air propelling devices in the cover unit it provides for optimum redundancy applicable to all separation units of the whole station, reducing failure risk.

In addition to that, the proposed separation station allows for optimum modularity and as compact as possible architecture.

According to a first preferred embodiment, the separation station is characterised in that said vertical collector wall structure takes the form of a round or oval vertically oriented cylinder or takes the form of a vertically oriented, preferably regular, polygonal prism, preferably with 3-8 essentially flat collector walls.

According to yet another preferred embodiment, said vertical collector wall structure takes the form of a vertically oriented, preferably regular, polygonal prism having 3-8, preferably 4-6 essentially flat collector walls, and wherein preferably at and/or between adjoining vertical edges of said collector walls vertical members are provided, acting as pillar stands for the separation station. The vertical members can take the form of grid posts.

According to yet another preferred embodiment, said vertical members downwardly protrude beyond a lower horizontal edge of said collector walls such that below the vertical collector walls there is a free space to the ground. In other words there is an upper part of the separation station in which the separation walls are located, and this upper part is distanced from the ground by way of these protruding portions of the vertical members.

Preferably supply tubing and/or control wiring for the separation units and/or, if present, for controlling doors for opening and/or closing of the separation units, is at least partly located within or adjacent to said vertical members, this is particularly useful in case there are interspaces between horizontal rows of separation units in the collector walls allowing for locating corresponding supply tubing and/or control wiring for the separation units and/or, if present, for controlling doors for opening and/or closing of the separation units, which can then be directly connected to the corresponding structures in the vertical members.

According to a further preferred embodiment, the separation station comprises at least 3, preferably in the range of 4-8 or 4-6 separate essentially flat vertical collector walls, wherein each collector wall comprises at least 4, preferably at least 8, preferably 8-25 or 10-20 separation units arranged in a regular array of vertical columns and horizontal rows.

Preferably adjoining vertical circumferential wall portions of adjoining separation units along the horizontal rows are formed as common joint walls, and between adjoining separation units between the horizontal rows there is an interspace between vertical circumferential wall portions of adjacent separation units, in which supply tubing and/or control wiring for the separation units and/or, if present, for controlling doors for opening and/or closing of the separation units, is located. This is particularly useful to be combined with corresponding supply and/or can stroll structures located in the vertical members.

As an alternative, adjoining vertical circumferential wall portions of adjoining separation units along the vertical columns can be formed as common joint walls, and between adjoining separation units between the vertical columns there can be an interspace between vertical circumferential wall portions of adjacent separation units, in which supply tubing and/or control wiring for the separation units and/or, if present, for controlling doors for opening and/or closing of the separation units, is located.

According to yet another preferred embodiment, the cover unit comprises a plurality of air propelling devices, preferably in the form of fans, wherein preferably these air propelling devices are arranged in an array, preferably in an array of at least 3×3 air propelling devices, preferably at least 4×4, 5×5 or 6×6 air propelling devices.

As mentioned above, each propelling device is fluidly connected with the common separation station cavity in that flow is permitted between the openings (facing the common separation station cavity) of all separation units and the air propelling devices. Since one separation unit or a group of separation units of the separation station is always closed, the air propelling device or array of air propelling devices just needs to provide the flow equivalent to the open separation units (less fans and less specific power consumption).

The separation station typically comprises a control allowing the plurality of air propelling devices to be controlled in a synchronised manner, in particular to be started and/or shutdown simultaneously, wherein preferably the separation station for that control comprises at least one or a group of frequency converters to jointly control the air propelling devices. In fact, the fan grid should be started simultaneously to avoid short cut flow through adjacent fans, also a decrease of starting current of the fan grid it is desirable to lower the extent of electrical cabeling. Simultaneous start of the fan grid may result in high inrush currents which can be 5-6 times higher than the high load current.

The solution to this is the use of frequency converters to slowly increase frequency and get up the system characteristic line to the desired operation point. The use of frequency converters allows to slowly increase frequency and go up the system characteristic line to the desired operation point.

Typically, the separation station comprises at least 3, preferably in the range of 4-6 separate essentially flat vertical collector walls, and each collector wall comprises at least 4, preferably at least 8, preferably 8-25 or 10-20 separation units arranged in a regular array of vertical columns and horizontal rows, so the separation units are arranged in matrices in the collector walls.

In such an arrangement, preferably the separation units of each collector wall further comprise at least one pair of opposing sliding doors for sealing the upstream opening and the downstream opening, respectively, of at least one cavity, wherein each pair of opposing sliding doors, to open the respective closed cavity, is shifted in a direction essentially parallel to the plane of the respective sliding door to uncover the upstream opening and the downstream opening, respectively, and to allow for flow-through of gas mixture through the cavity.

In such a setup each collector wall preferably comprises only one common pair of arrays of sliding doors in the form of a pair of horizontal sliding door rows being shifted in a vertical direction between cycles of adsorption and desorption and to close and open rows of separation units. Preferably adjoining vertical circumferential wall portions of adjoining separation units along the horizontal rows are then formed as common joint walls, and/or between adjoining separation units between the horizontal rows there is an interspace between horizontal circumferential wall portions of adjacent separation units, in which supply tubing and/or control wiring for the separation units is located.

Alternatively, the sliding doors take the form of a pair of vertical sliding door columns being shifted in a horizontal direction between cycles of adsorption and desorption and to close and open rows of separation units, wherein preferably adjoining horizontal circumferential wall portions of adjoining separation units along the vertical columns are formed as common joint walls, and/or wherein between adjoining separation units between the vertical columns there is an interspace between vertical circumferential wall portions of adjacent separation units, in which supply tubing and/or control wiring for the separation units is located.

The at least one cavity can preferably be of rectangular or square cross section, in which case a set of four contiguous and sealing circumferential wall elements is provided, a lower wall element, an opposed upper wall element and two opposed lateral circumferential wall elements joining corresponding ends of the upper and lower wall element, and circumferentially enclosing the cavity. Said set of four contiguous and sealing circumferential wall elements is defining an upstream opening and an opposed downstream opening of the cavity.

In case of adjacent cavities of the separation unit in an array, adjacent walls of neighboring cavities can be formed by wall elements common to the neighboring cavities.

When defining a lower wall element and an opposed upper wall element this implies that the respective cavity has to be oriented with a horizontal flow through direction.

The at least one cavity can also be of polygonal cross section, e.g. it may comprise a set of eight contiguous and sealing circumferential wall elements, at least one lower wall element, at least one opposed upper wall element and at least two opposed lateral circumferential wall elements joining corresponding ends of the upper and lower wall element directly or via oblique further wall elements, preferably in this case forming an hexagonal structure, and circumferentially enclosing a cavity, said set of eight contiguous and sealing circumferential wall elements defining the upstream opening and the opposed downstream opening of the cavity.

The proposed principle can be applied to any polygonal or round flow through cross sectional shape being defined by an essentially cylindrical contiguous and sealing circumferential wall element or set of wall elements forming the respective cavity. Possible are e.g. triangular, rectangular, quadratic, pentagonal, hexagonal, octagonal cross sectional shapes.

Also round structures are possible. In this case the at least one cavity comprises one single circular or oval circumferential wall element.

Said at least one cavity contains or at least allows containing at least one gas adsorption structure for adsorbing said at least one gaseous component, preferably under ambient pressure and/or temperature conditions. If the separation unit contains more than one cavity, for example in an array, each cavity contains or may contain at least one individual gas adsorption structure of that kind.

In accordance with his aspect of the present invention, each or a group of separation units comprises a pair of opposing sliding doors for sealing the upstream opening(s) and the downstream opening(s), respectively, of at least one cavity in a closed state thereof. The pair of opposing sliding doors seals. If there is provided more than one cavity with one pair of doors, the pair of opposing sliding doors can at the same time also seal more than one of (but not necessarily all of) these cavities at a time.

Typically, the pair of opposing sliding doors is mounted so as to synchronously open and close cavities depending on the operational status.

The pair of opposing sliding doors is preferably mounted to alternatingly close one cavity or a group of cavities at a time only and then to be shifted to a next cavity or group of cavities, and so on, preferably in a cyclic manner as will be detailed further below. In such an array, said pair of opposing sliding doors can also be mounted to allow for a position in which no cavity is sealed and preferably all cavities are available for flow-through or other functions which do not require sealing by said pair of opposing sliding doors, as will be detailed further below.

To open the at least one cavity, the pair of opposing sliding doors can be shifted in a direction essentially parallel to the plane of the respective sliding door to uncover the upstream and downstream opening, respectively and to allow for flow through of gas mixture through the respective cavity and the gas adsorption structure located therein. To release a corresponding sealing mechanism, the sliding motion of the door may involve phases in which the door is lifted away from the corresponding opening in addition or concomitant to the sliding.

The proposed separation station in particular allows to provide for an array of cavities as will be described further below, in which one single pair of sliding doors is used for alternatingly closing and opening adjacent cavities containing adsorption structures, and allowing for cyclic operation of adjacent cavities. An appropriate number of cavities can be combined in such an array, inter-alia depending on the temporal distribution between adsorption and desorption. If e.g. the ratio between the two phases is 2:1, a structure in the form of a separation unit containing an array of three cavities and one pair of opposing sliding doors mounted so as to alternatingly close one of the cavities in the array for the desorption steps while the other two cavities in the array are subjected to transverse flow-through of air and/or gas mixture and the adsorption process.

In a further embodiment of the invention, the sliding doors can move into a position outside of the array of cavities containing adsorber structures. In case of such a 'neutral' position the temporal distribution of the adsorption-desorption process is uncoupled from the geometric constructional arrangement of the cavities and array, as the doors may be placed in this position if no closing of a cavity is needed, thus allowing for any desorption and adsorption timing. Placement of this 'neutral' position to the bottom or the side of such an array of cavities will further provide a safe position for the doors to be held while commissioning, maintenance or other work is conducted on the adsorption structures within the array.

So in case of an array of cavities, the pair of sliding doors can be positioned adjacent to the array of cavities or in a slot between cavities in such a way as to not seal any cavity and that all cavities are open to through flow of the gas mixture, and the sliding doors can subsequently be moved to a cavity which has been exposed to gas mixture adsorption for the longest time span, to seal that next cavity, and then this cavity is exposed to conditions so as to desorb and extract the gaseous component requiring desorption as necessary, or for the sliding doors to remain at the adjacent position to allow for commissioning, maintenance or other work on the entire structure or array of cavities.

Preferably, the sliding doors allow for evacuation of the cavity, which is then a vacuum cavity, to a pressure of less than 700 mbar(abs) or less than 500 mbar(abs), preferably to a pressure of less than 300 mbar(abs) or to a pressure of less than 150 mbar(abs) or at most 100 mbar(abs). Preferably the separation unit in a closed state allows evacuating the cavity to a pressure in the range of 500-10 mbar(abs).

Further preferably, the sliding door allows exposure of the cavity to an overpressure (typically relative to normal outside pressure of 1.01325 bar) of up to +0.1 bar(g) or up to +0.2 bar(g) or +0.5 bar(g).

According to a preferred embodiment of the proposed separation unit with sliding doors, the upper and lower wall elements of the at least one cavity are arranged parallel to each other, the lateral wall elements are arranged parallel to each other, and preferably also the pair of opposing sliding doors is arranged parallel to each other.

Preferably forming the entry of the inlet one or a set of preferably movable louvres is provided, preferably movable louvres are provided.

One or both sliding doors can be mounted on a pair of upper and lower rails, or can be mounted on a pair of rails at opposing lateral sides of the unit. The rails can be C rails.

Preferably the doors are travelling in or on these rails with rollers, and wherein further preferably means are provided which can press the respective door to a corresponding axial face of the respective opening at the position for closing in particular with the aim of generating a seal, and to distance the door again from that sealing position to allow for sliding the door to free the respective opening and wherein further the upper and lower rails on which the door travels (or the lateral rails in case of doors moving up and down) can extend beyond the array dimensions to allow the door to pass into to the above-mentioned neutral position.

The sliding door and/or the respective opening the cavity (ies) can be provided with at least one circumferential sealing element, preferably in the form of at least one sealing ring and/or in the form of a sealing coating.

The means to allow pressing of the respective door to a corresponding axial face and to free the respective opening to distance the door again can for example be provided by the pair of upper and lower rails being mounted on a frame or the circumferential walls in an axially shiftable manner, preferably by way of pneumatic drive.

Preferably, the pair of sliding doors is driven each or jointly by a belt, for example mounted on a pair of pulleys.

The axial length of the circumferential wall, i.e. the length of the wall in the flow-through direction of the at least one cavity, is preferably smaller than the minimum distance of opposing circumferential wall elements.

The circumferential wall may enclose a rectangular or square cross section and the pair of sliding doors is correspondingly rectangular or square.

The sliding drive of the pair of doors can be built to allow (only) synchronous pairwise parallel movement of the doors, at least during the capture process. Possibilities may be provided to also move the doors unsynchronised in particular for maintenance.

The separation unit may furthermore comprise at least one stabilizing element, preferably in the form of at least one stabilizing strut, at or in at least one or preferably all of the cavities, to make sure that the structure is sufficiently strong to withstand, if desired, the vacuum or overpressure conditions. For the same purpose at least one, preferably both sliding doors may comprise stabilizing elements, preferably in the form of ribbing, preferably on the outer side with respect to the cavity.

As pointed out above, typically said pair of opposing sliding doors is mounted to allow for alternatingly sealing one cavity of the separation station as well as successively the other cavity(ies). Preferably said pair of opposing sliding doors is mounted in such an array to allow for a position in which no cavity is sealed and preferably all cavities are available for flow-through or other functions which do not require sealing by said pair of opposing sliding doors.

The cavities in such an array can have any of the cavity structures as detailed above, i.e. can have a cross-sectional shape which is rectangular, triangular, square, hexagonal, octagonal or round, and preferably all cavities of the separation unit have the same cross-sectional shape and dimension to allow for sealing each of them with the same pair of opposing sealing doors alternatingly.

One benefit of this solution against the current state of the art is that the infrastructure of the pair of opposing movable sealing doors can be utilized for many cavities allowing for cost savings and improvements in reliability against multiple doors or lids. Further the complexity and sensitivity of the moving element is far lower thereby reducing risk. Further still, in regeneration methods utilizing a thermal and/or steam swing, the doors remain hot when moved between regenerating cavities thereby reducing the effective thermal mass of the regeneration and therefore the energy demand. Yet another benefit of this applied to pressure and temperature swing processes is the amount of structural cavity material per unit enclosed volume, which due to the common separation walls, the common door and mutually stabilizing circumferential walls is significantly lower in this invention than any prior art device and leads to significant cost, complexity and energy savings in thermal swing processes. Finally, the clear benefit of the invention is that the complete cross section of the respective cavity is available as flow through area without impediments common to flaps, lids, valves or other flow restrictions. Correspondingly, given an allowable pressure drop 'budget', this complete value can be applied to the gas adsorption structure held in the cavity through which the gas flow must pass resulting in higher volume gas flows and in application of gas separation a higher uptake rate of the relevant species.

In such an array the cavities of the array in a collector wall can be arranged adjacent to each other in one or more rows, and circumferential wall elements of adjacent cavities can be formed by common separation walls. Preferably the cavities of the array are arranged in one single horizontal or vertical row and directly adjacent to each other.

Typically, such a collector wall contains one single frame forming the circumferential wall elements of all cavities.

According to yet another preferred embodiment of the separation station at least one, preferably all cavities of the separation units contain at least one sorbent cassette which, as a self-supporting unit, can be taken out and/or inserted into a respective cavity.

Preferably said sorbent cassette comprises at least one sorbent monolith, sorbent sheet, sorbent coating, honeycomb or a sorbent cavity provided by a mesh or grid structure, the mesh width of which is smaller than the smallest particle size of particulate adsorber particles, wherein preferably the mesh is a wire grid, preferably a metal or polymer wire grid, most preferably an aluminium or stainless steel metal wire grid.

Particulate adsorber particles in such a sheet, coating or sorbent cavity can be amine functionality carrying polymer-based or inorganic particles suitable and adapted for carbon dioxide capture and/or are at least partly inorganic, organic or active carbon based particles, preferably functionalised with alkali carbonate or with amine functionality suitable and adapted for carbon dioxide capture and/or metal organic frameworks.

Particulate adsorber particles in such a sheet, coating or sorbent cavity may have a particle size in the range of 0.01-5 mm or in the range of 0.5-2 mm and have the property of flowing without substantial mechanical attrition and the carrier structure of which is preferably selected from the group of polymers, ceramics, organic solids, zeolites, metals, clays, capsules or hybrids thereof.

To the lower side and facing the ground said separation station cavity may further be covered and closed by at least one bottom cover unit. Preferably such a bottom cover unit comprises one or a plurality of air propelling devices, preferably in the form of fans, wherein preferably these air propelling devices are arranged in an array, preferably in an array of at least 3×3 air propelling devices, preferably at least 4×4, 5×5 or 6×6 air propelling devices. Also, such a bottom cover unit be structured as yet another collector wall, in this case a horizontal collector wall, to provide for additional sorbent structures to be located and coupled with the common separation station cavity.

It is also possible that the collector wall structures extend to the ground, so if there are vertical members they may also not protrude beyond the lower horizontal edge of the collector wall structures, or it is possible that there is an interspace between the lower horizontal edge of the collector wall structures and the ground on which the separation station is standing, but there are vertical walls between the vertical members below the collector wall structures. In these vertical members there may also be located propelling devices.

So the separation station may also be structured in preferably said vertical collector wall structure takes the form of a vertically oriented, preferably regular, polygonal prism having 3-8, preferably 4-6 essentially flat collector walls, and wherein at and/or between adjoining vertical edges of said collector walls vertical members are provided, acting as pillar stands for the separation station, and in that either said vertical members downwardly protrude beyond a lower horizontal edge of said collector walls such that below the vertical collector walls there is a free space to the ground, and between the vertical members, the lower horizontal edge of each of said collector walls and the ground, on which the separation station is located, there are contiguous sealing walls (which may also be provided with air propelling devices), preventing inflow of outside air into the single common separation station cavity from below the vertical collector walls, or wherein a lower horizontal edge of said collector walls is essentially aligned with the ground (if need be locally sealed by additional sealing element/walls), on which the separation station is located, preventing inflow of outside air into the single common separation station cavity from below the vertical collector walls.

In such a setup, each air propelling device is fluidly connected with the common separation station cavity in that flow is permitted between the openings of all separation units facing the common separation station cavity and the air propelling devices.

Further preferably in such a setup the separation station comprises a control allowing the plurality of air propelling devices in the bottom cover unit to be controlled in a synchronised manner between the air propelling devices in the bottom cover unit and/or synchronised with the air propelling devices in the cover unit, in particular to be started and/or shutdown simultaneously, wherein preferably the separation station for that control comprises at least one or a group of frequency converters to jointly control the air propelling devices said bottom cover unit and/or cover unit.

According to yet another preferred embodiment of such a separation station, it is attached to or encompasses at least one or a plurality of common evacuation units, and/or one or a plurality of common heating and/or steam supply unit, and/or one or a plurality of common collection units for the gaseous component, and/or one or a plurality of sets of louvres at the upstream side, in each case common for all cavities or for all cavities in one vertical collector wall structure.

According to a further aspect of the present invention, it relates to a method of operating a separation station as described above and containing at least one array of separation units, for separating gaseous carbon dioxide from a gas mixture, preferably from at least one of ambient atmospheric air, flue gas and biogas, containing said gaseous carbon dioxide as well as further gases different from gaseous carbon dioxide, by cyclic adsorption/desorption using a sorbent material of said gas adsorption structure adsorbing said gaseous carbon dioxide in said separation units.

The method comprises at least the following sequential and in this sequence repeating steps (a)-(e) carried out for each of the separation units in a coordinated manner:

(a) contacting said gas mixture with the sorbent material to allow at least said gaseous carbon dioxide (parts thereof or essentially all of the CO2) to adsorb on the sorbent material by flow-through through said unit (and thus through and/or over the sorbent material adsorbing at least part of said gaseous carbon dioxide) under ambient atmospheric pressure conditions and ambient atmospheric temperature conditions in an adsorption step (if ambient atmospheric air is pushed/pulled through the device using a ventilator for the like, this is still considered ambient atmospheric pressure conditions in line with this application, even if the air which is pushed/pulled through the reactor by the ventilator has a pressure slightly above or below the surrounding ambient atmospheric pressure, and the pressure is in the ranges as detailed below in the definition of "ambient atmospheric pressures");

(b) isolating said sorbent material with adsorbed carbon dioxide in said unit from said flow-through, preferably while essentially maintaining the temperature in the sorbent;

(c) inducing an increase of the temperature of the sorbent material, preferably to a temperature between 60 and 110° C., starting the desorption of CO2. This is e.g. possible by injecting a stream of partially of fully saturated or superheated steam, preferably by flow-through through the unit and over/through the sorbent, and thereby inducing an increase of the temperature of the sorbent material to a temperature between 60 and 110° C., starting the desorption of CO2;

(d) extracting at least the desorbed gaseous carbon dioxide from the unit (preferably most or all of the desorbed gaseous carbon dioxide) and separating gaseous carbon dioxide, preferably by condensation, in or downstream of the unit;

(e) bringing the sorbent material to ambient atmospheric temperature conditions and ambient atmospheric pressure conditions (if the sorbent material is not cooled in this step down to exactly the surrounding ambient atmospheric temperature conditions, this is still considered to be according to this step, preferably the ambient atmospheric temperature established in this step (e) is in the range of the surrounding ambient atmospheric temperature +25° C., preferably +10° C. or +5° C.).

In the context of this disclosure, the expressions "ambient atmospheric pressure" and "ambient atmospheric temperature" refer to the pressure and temperature conditions to that a plant that is operated outdoors is exposed to, i.e. typically ambient atmospheric pressure stands for pressures in the range of 0.8 to 1.1 barabs and typically ambient atmospheric temperature refers to temperatures in the range of −40 to 60° C., more typically −30 to 45° C. The gas mixture used as input for the process is preferably ambient atmospheric air, i.e. air at ambient atmospheric pressure and at ambient atmospheric temperature, which normally implies a CO2 concentration in the range of 0.03-0.06% by volume, and a relative humidity in the range of 3-100%. However, also air with lower relative humidity, i.e. <3%, or with lower or higher CO2 concentration can be used as input for the process, e.g. with a concentration of 0.1-0.5% CO2 by volume, so generally speaking, preferably the input CO2 concentration of the input gas mixture is in the range of 0.01-0.5% by volume.

According to the proposed method, during the whole cycle the at least one or the plurality of air propelling devices in said cover unit is operated so as to withdraw air from the common separation station cavity, and wherein, if so present, the at least one or the plurality of air propelling devices in said bottom cover unit is operated so as to withdraw and/or push air into the common separation station cavity.

Alternatively it is possible to operate such a unit so as to push air into the common separation station cavity using the air propelling devices in said cover and, wherein, if so present, to operate the at least one or the plurality of air propelling devices in said bottom cover to also push air into the common separation station cavity.

Preferably, according to this method, in the separation station in said array of separation units the sequential and in this sequence repeating steps are carried out in a synchronised manner, such that at least half of the separation units, preferably at least three quarters of the separation units, more preferably at least three quarters or at least ⅘ of the separation units of the whole separation station are in the adsorption step and the respective remaining separation units are going through the other steps.

According to a preferred embodiment of this method, for operating a separation station as described above having at least one pair of sliding doors, this pair of sliding doors is positioned to seal one cavity of the array for steps (b)-(e) while the other cavities are open to flow through to the gas mixture in step (a), the sealed cavity is exposed to conditions so as to desorb and extract the gaseous component while the other cavities are driven by said propelling devices to adsorb the at least one gaseous component from the gas mixture, and once the desorption in the sealed cavity is terminated, the pair of sliding doors is shifted to a next cavity or array of cavities, preferably the one in the array which has been exposed to gas mixture adsorption for the longest time span, to seal that next cavity or array of cavities, and then this next cavity or array of cavities is exposed to conditions in steps (b)-(e) so as to desorb and extract the gaseous component while the other cavities are driven by gas or air propelling devices in step (a) to adsorb the at least one gaseous component from the gas mixture, wherein preferably that sequence of steps is continued analogously to seal and extract sequentially all the cavities in the array and to cyclically iterate that sequence of adsorption and desorption steps equal to the number of cavities in the array at least once, preferably at least 100 times, or at least 1'000 times.

Finally the present invention relates to the use of a separation station as described above, or of a method as described above, for the separation of carbon dioxide and/or water vapor from ambient air.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIGS. 1a)-1d) show a separation station and parts thereof in different views, wherein in FIG. 1a) an isometric view is shown in an oblique viewing angle from the top, in FIG. 1b) the cover unit with fans, in FIG. 1c) a collector wall, and in FIG. 1d) a vertical central cut with schematic indication of the airflow.

DESCRIPTION OF PREFERRED EMBODIMENTS

Figure 2B:
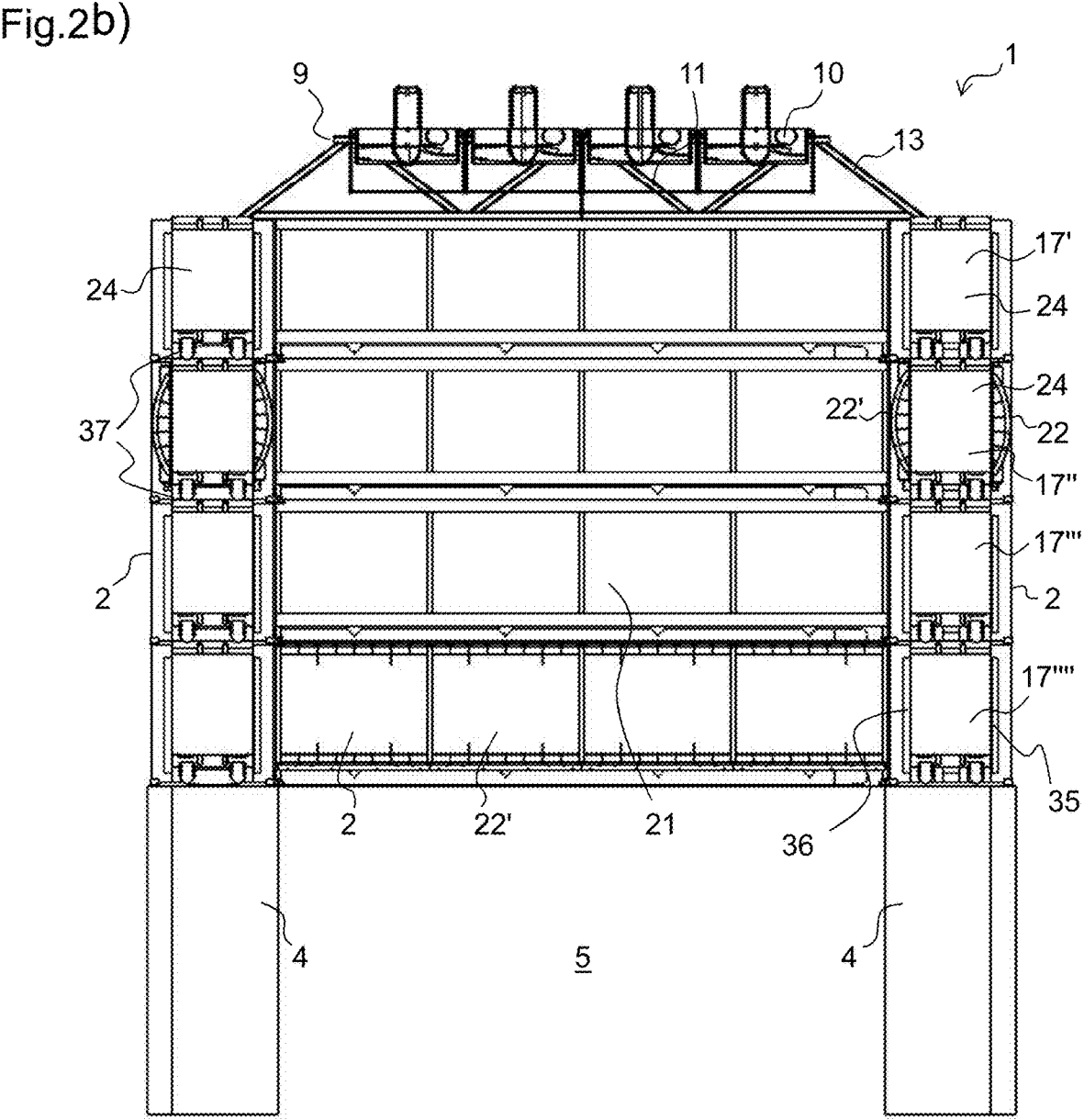
FIGS. 2a)-2e) show a separation station with vertically moving sliding doors and parts thereof in different views, wherein in FIG. 2a) an isometric view in an oblique viewing angle from the top, in FIG. 2b) a vertical cut with the sliding doors closing the upper collector row without sorbent cassettes, in FIG. 2c) a vertical cut with the sliding doors closing the upper collector row with sorbent cassettes, in FIG. 2d) a detailed cut illustrating the supply of the sorbent cavities and in FIG. 2e) a side view with the sliding doors closing the upper collector row.

FIGS. 1a)-1d) show a separation station 1 in a schematic representation.

The separation station 1 comprises four identical modular vertically arranged collector walls 2, which at the edges are connected and carried by vertical members 3 which act as stand posts for the separation station 1. The members 3 have protruding parts 4 by way of which the collector walls 2 and more specifically the lower horizontal edges 38 thereof are distanced from the ground, forming flow-through areas 6 below the collector walls and a free space 5 below the upper part of the separation station 1. There can be bracing 7 to stabilise the whole structure.

In this case the free space 5 below the upper part of the separation station 1, so below the lower horizontal edge of the collector walls 2, is open for inflow of air. However to optimise the airflow through the collector walls 2, typically this free space 5 is covered by contiguous sealing walls, or the upper part of the separation station 1 may be covered by a horizontal contiguous sealing wall essentially at the level of the lower horizontal edge 38 of the collector walls 2. It is also possible to have a horizontal further collector wall 2 with sorbents closing the separation station cavity 21 to the bottom.

In these vertical members 3, tubing and/or supply and/or control lines can be located, and in particular the upper part of the vertical members 3 can be provided as grid structures 8. The collector walls 2 enclose one common separation station cavity 21, which to the top is covered by a cover unit 9 with an array of fans 10. In addition this cover unit 9 comprises a support structure 11, and baffle plates 12 and a cover plate 13 in which the fans 10 are mounted. Correspondingly the cover unit 9 essentially seals the common separation station cavity 21 to the top.

The upper wall 15 of the respective collector wall abuts with the cover unit 9, and the lateral walls 16 are adjoining the vertical members 3, typically the lateral walls have a width which corresponds to the width of the vertical member.

the common separation station cavity can be closed and sealed to the bottom, essentially at the height of the lower horizontal edge 38 of the walls 2, by a bottom cover plate (not illustrated)

In each collector wall 2 there is provided a two-dimensional array of 16 square or rectangular separation units 34.

Each separation unit 34 has an upstream opening 35, which is facing the outside of the separation station, and a downstream opening 36, which is facing the separation station cavity 21. The separation units 34 are arranged in a regular array forming collector rows 17, specifically an uppermost collector row 17', followed by in a downwards direction and adjacent to an upper collector row 17", followed buy in a downwards direction and adjacent to a lower collector row 17''', and terminated to the bottom by an adjacent lowermost collector row 17''''.

In the vertical direction these separation units form collector columns 23, specifically (see also FIGS. 2a)-2e)) forming a respective left most collector section 23', followed to the right and adjacent to the left collector row 23", followed to the right and adjacent to the right collector row 23''', and to finish the array with the right most collector row 23''''.

The airflow in such a separation station 1 is typically structured as illustrated in FIG. 1d), namely the fans 10 withdraw air from the separation station cavity 21 such that it is expelled in a vertical direction illustrated by arrow 20, and such that it is sucked into the separation station cavity 21 in a horizontal direction as illustrated by arrow 19.

On the upstream side the collector walls and/or the separation units may comprise sets of louvres 18, which can be adjustable to control the direction of airflow.

More specifically a further example of a separation station is illustrated in FIGS. 2a)-2e). Reference numerals in this set of figures designate the same elements or equivalent elements as already discussed in the context of FIGS. 1a)-1d). In this embodiment, there is provided one common horizontally extending sliding door 22 which at the same time covers one row of separation units 34 in one of the separation walls 2. There is provided a corresponding vertically moving sliding door on the outer side 22 and a vertically moving sliding door on the inner side 22', and those sliding doors are moving in synchrony and parallel to each other at the same height depending on the carbon dioxide capture cycle.

In the illustration in FIG. 2a) the sliding door in the left front collector wall is in the lowermost position, i.e. covering the lowermost collector row 17'''', so this collector row or rather the collector units of that collector row are going through steps (b)-(e) as detailed above.

The collector units of the other rows of that collector wall 2 are going through adsorption according to step (a) as detailed above.

As illustrated in FIG. 2b), each of the collector units comprises a circumferential set of walls enclosing a sorbent cavity 24. As one can see on the right side of that figure, the sliding doors have a curved convex profile to allow for an increased available vacuum without large thermal mass of the sliding door structure.

As illustrated in FIG. 2c), in these cavities 24 there are located sorbent cassettes, which for maintenance are provided as separate self-standing structures or a set of separate self-standing structures to be put into these cavities 24.

The sorbent cassettes 25 may for example comprise individual horizontal or vertical parallel layers coated with carbon dioxide reversibly adsorbing materials or comprise particulate material in corresponding air permeable containers for carbon dioxide adsorption. Materials suitable and adapted for this purpose are in particular primary and/or secondary amine carrying polymer beads, which can be contained in corresponding mesh structures.

Figure 2D:
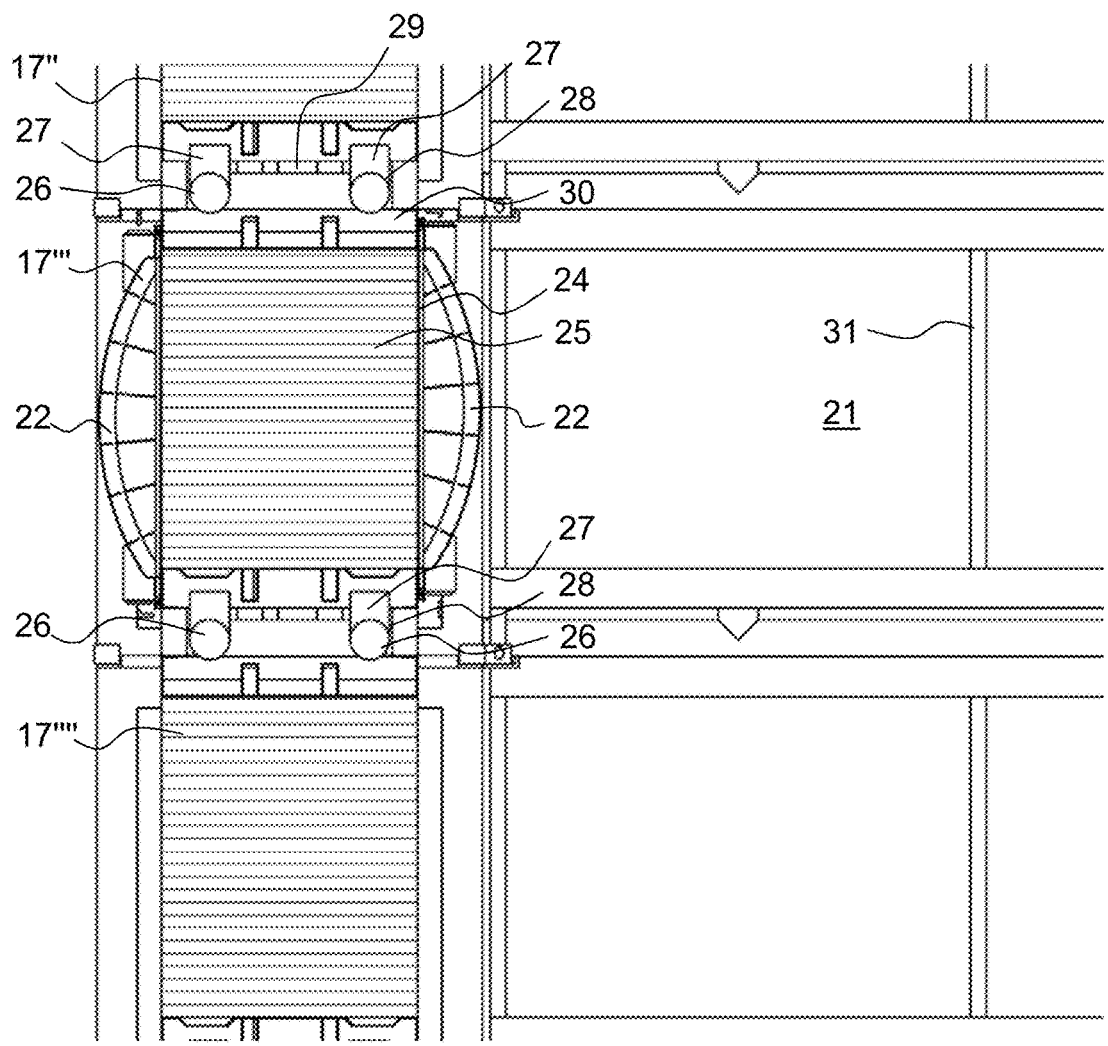

In this example, see also FIG. 2d), horizontally adjacent separation units 34 are directly adjacent and the circumferential wall elements which are adjacent formed by one single wall 31.

On the other hand vertically adjacent separation unit rows 17 are arranged at a distance leaving an interspace 37 between the rows 17, and in this interspace 37 between the lower horizontal separation wall of the upper sorbent cavity 29 and the upper horizontal separation wall 30 of the lower sorbent cavity there is room for horizontal tubing 26 for the individual separation units and for control of the individual separation units and/or the corresponding sliding doors. This tubing 26 in this way can be ideally connected to the tubing 14 in the vertical members. The tubing 26 is connected to the corresponding separation unit 34 by way of inlets/outlets 27 and corresponding controllable valves 28.

As one can see from FIG. 2e), the sliding doors 22 are mounted on vertically extending rails 32 which can be mounted on the vertical members 3 or at the lateral edges of the collector wall 2.

Corresponding motors or more generally drive means for the sliding doors 22 and 22' as well as the corresponding control means can also be located at the lateral edges of the collector wall or in or on the vertical members 3.

Figure 3A:
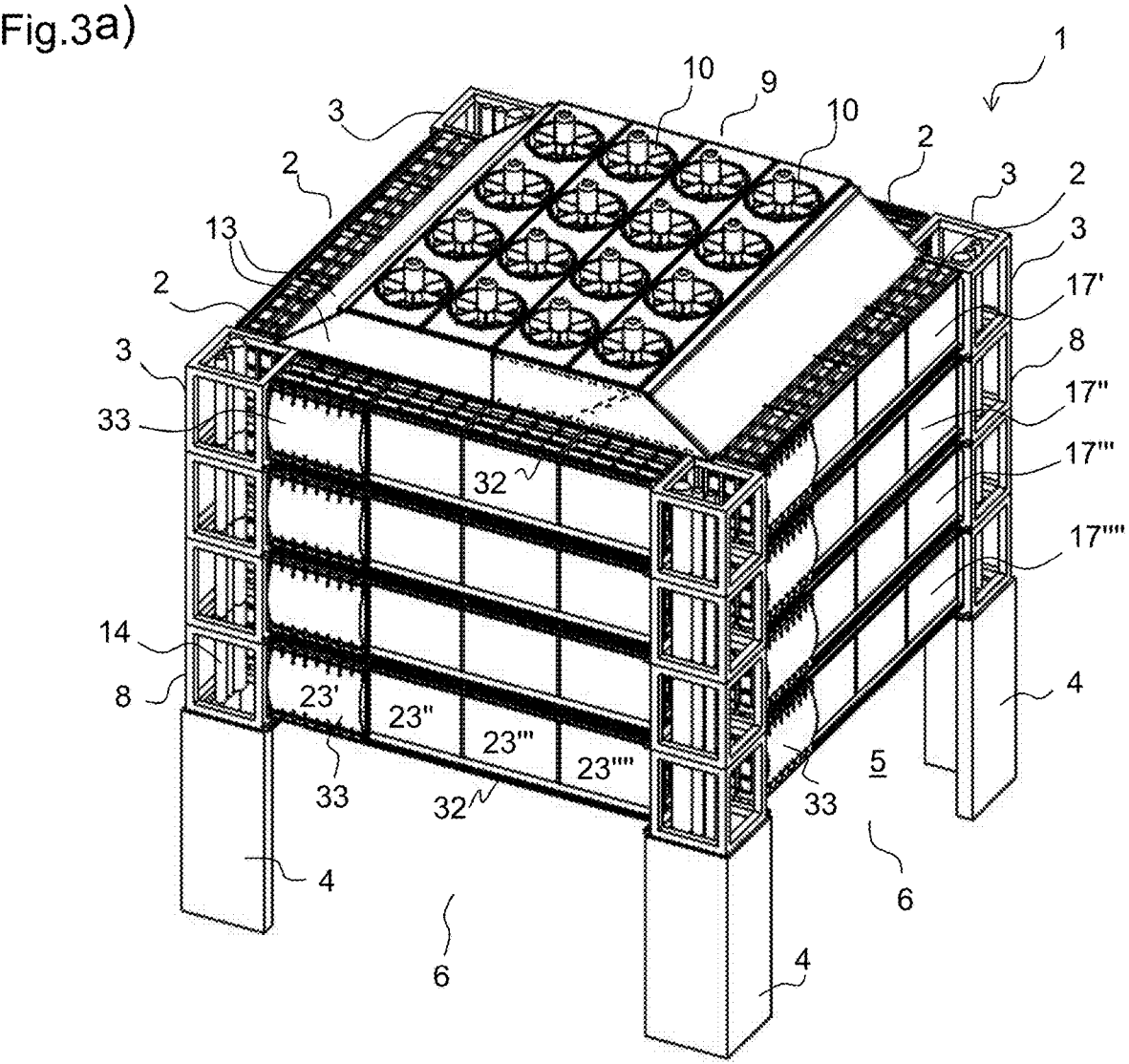
FIGS. 3a)-3d) show a separation station with horizontally moving sliding doors and parts thereof in different views, wherein in FIG. 3a) an isometric view in an oblique viewing angle from the top, in b) a vertical cut with the sliding doors closing the rightmost collector sections in the back wall and on the left side without sorbent cassettes, in FIG. 3c) a vertical cut like in FIG. 3b) but with sorbent cassettes, in FIG. 3d) a side view with the sliding doors closing the left most collector sections.

A third example of a corresponding separation station as illustrated in FIGS. 3a)-3d). Again reference numerals in this set of figures designate the same elements or equivalent elements as already discussed in the context of FIGS. 1a)-1d) and 2a)-2d). In this case there is no joint horizontally extending common sliding door 22, but there is vertical array of sliding doors 33. Again there is a horizontally moving common sliding door on the outer side 33 and a horizontally moving sliding door on the inner side 33", and they move in synchrony in the cycle. Again they can be provided as one single stiff structure so as to simplify the corresponding rail structure, which in this case is provided as air of horizontally arranged rails 32 at the respective upper and lower edge of the respective collector wall 2. But they can also be structured as individual doors, in this case necessitating four pairs of horizontally arranged rails.

LIST OF REFERENCE SIGNS 1 separation station
2 collector wall
3 vertical member
4 protruding part of 3
5 free space below upper part of 1
6 flow-through area between 4
7 bracing
8 upper part of 3, grid structure
9 cover unit with fans
10 fan
11 support structure of 9
12 baffle plate of 9
13 cover plate of 9
14 tubing/supply/control lines in 3
15 upper wall of 2
16 lateral wall of 2
17 collector row
17' uppermost collector row
17" upper collector row
17''' lower collector row
17'''' lowermost collector row
18 louvres
19 essentially horizontal inflow of air
20 essentially vertical outflow of air 21 separation station cavity, enclosed space of separation unit
22 vertically moving sliding door on the outer side
22' vertically moving sliding door on the inner side
23 collector column
23' left most collector row or section of uppermost collector row
23" left collector row or section of uppermost collector row
23'" right collector row or section row or of uppermost collector row
23"" rightmost collector row or section of uppermost collector row
24 sorbent cavity
25 sorbent cassette in separation unit
26 horizontal tubing
27 inlet/outlet of 26
28 valve
29 lower horizontal separation wall of upper sorbent cavity
30 upper horizontal separation wall of lower sorbent cavity
31 vertical separation walls between sorbent sections
32 rail for sliding door
33 horizontally moving sliding door on the outer side
33' horizontally moving sliding door on the inner side
34 collector section, separation unit
35 upstream opening of 34
36 downstream opening of 34
37 interspace between rows
38 lower horizontal edge of collector wall

The invention claimed is:

1. A separation station with a plurality of stationary separation units for separating carbon dioxide and/or water vapour from ambient air,
wherein each separation unit comprises at least one contiguous and sealing circumferential wall circumferentially enclosing at least one cavity,
said at least one contiguous and sealing circumferential wall defining an upstream opening and an opposed downstream opening,
said at least one cavity containing at least one gas adsorption structure for adsorbing said carbon dioxide and/or water vapour, including under ambient pressure and/or temperature conditions,
wherein said plurality of separation units is arranged in at least one essentially vertical collector wall structure, laterally enclosing one single common separation station cavity,
wherein at an upper side of the separation station, said separation station cavity is covered and closed by at least one cover unit with at least one air propelling device,
and wherein the separation station comprises said vertical collector wall structure formed by four separate flat collector walls, wherein each collector wall comprises at least four separation units arranged in a regular array of vertical columns and horizontal rows; and
wherein said vertical collector wall structure takes the form of a vertically oriented, polygonal prism having the four flat collector walls, and wherein at or between adjoining vertical edges of said collector walls, vertical members are provided, acting as pillar stands for the separation station.

2. The separation station according to claim 1, wherein the cover unit comprises a plurality of air propelling devices, in the form of fans,
wherein each propelling device is fluidly connected with the common separation station cavity in that flow is permitted between the openings of all separation units, which openings are facing the common separation station cavity, and the air propelling devices.

3. The separation station according to claim 2, wherein the separation station comprises a control allowing the plurality of air propelling devices to be controlled in a synchronised manner, including to be started and/or shutdown simultaneously.

4. The separation station according to claim 1
and wherein the separation units of each collector wall further comprise at least one pair of opposing sliding doors for sealing the upstream opening and the downstream opening, respectively, of at least one cavity,
and wherein each pair of opposing sliding doors, to open the respective closed cavity, is shifted in a direction essentially parallel to the plane of the respective sliding door to uncover the upstream opening and the downstream opening, respectively, and to allow for flow-through of gas mixture through the cavity.

5. The separation station according to claim 4, wherein each collector wall comprises only one common pair of arrays of sliding doors
in the form of a pair of horizontal sliding door rows being shifted in a vertical direction between cycles of adsorption and desorption and to close and open rows of separation units,
or in the form of a pair of vertical sliding door columns being shifted in a horizontal direction between cycles of adsorption and desorption and to close and open rows of separation units.

6. The separation station according to claim 1, wherein all cavities of the separation units contain at least one sorbent cassette which, as a self-supporting unit, can be taken out and/or inserted into a respective cavity.

7. The separation station according to claim 1, wherein at a lower side of the separation station and facing the ground said separation station cavity is covered and closed by at least one bottom cover unit,
wherein each propelling device is fluidly connected with the common separation station cavity in that flow is permitted between the openings of all separation units facing the common separation station cavity and the air propelling devices,
or wherein the separation station comprises a control allowing a plurality of air propelling devices in said bottom cover unit to be controlled in a synchronised manner between the air propelling devices in said bottom cover unit and/or synchronised with the air propelling devices in the cover unit.

8. A separation station according to claim 1, wherein the separation station is attached to or encompasses at least one or a plurality of common evacuation units, or one or a plurality of common heating or steam supply units, or one or a plurality of common collection units for a gaseous component, or one or a plurality of sets of louvres at an upstream side of said vertical collector wall structure, in each case common for all cavities or for all cavities in one vertical collector wall structure.

9. The separation station according to claim 1
wherein
either said vertical members downwardly protrude beyond a lower horizontal edge of said collector walls such that below the vertical collector walls there is a free space to the ground, and between the vertical members, the lower horizontal edge of each of said collector walls and the ground, on which the separation station is located, there are contiguous sealing walls, preventing inflow of outside air into the single common separation station cavity from below the vertical collector walls, or wherein a lower horizontal edge of said collector walls is essentially aligned with the ground, on which the separation station is located, preventing inflow of outside air into the single common separation station cavity from below the vertical collector walls.

\* \* \* \* \*